United States Patent [19]

Durr et al.

[11] 4,175,932
[45] Nov. 27, 1979

[54] METHOD FOR CONTINUOUS VAPOR RECOVERY

[76] Inventors: Larry J. Durr, 4714 Lynton Ct., Indianapolis, Ind. 46254; Larry L. Durr, 8707B Pemberton Cir., Indianapolis, Ind. 46260; B. Jan Clay, 7650 Eagle Valley Pass, Indianapolis, Ind. 46234

[21] Appl. No.: 886,290

[22] Filed: Mar. 13, 1978

Related U.S. Application Data

[63] Continuation-in-part of Ser. No. 779,471, Mar. 21, 1977, abandoned, which is a continuation of Ser. No. 673,931, Apr. 5, 1976, abandoned.

[51] Int. Cl.$^2$ .............................................. B01D 53/04
[52] U.S. Cl. ............................................ 55/59; 55/74; 55/243; 55/387; 8/142
[58] Field of Search ................... 55/74, 243, 328, 387; 210/33, 189, 241; 252/420; 8/141, 142; 34/32, 37, 77, 80; 68/18 R, 18 C, 18 F; 202/190; 203/67, 96

[56] References Cited

U.S. PATENT DOCUMENTS

| 239,962 | 4/1881 | Jennings | 252/420 |
|---|---|---|---|
| 1,776,883 | 9/1930 | Cabrera | 210/241 X |
| 1,842,316 | 1/1932 | Coulter | 55/243 X |
| 1,868,581 | 7/1932 | Miller | 252/420 |
| 2,087,157 | 7/1937 | Lind | 210/189 X |
| 2,181,672 | 11/1939 | Sutcliffe et al. | 34/32 |
| 2,330,655 | 9/1943 | Zucker | 34/80 |
| 2,656,696 | 10/1953 | McDonald | 8/142 X |
| 2,660,869 | 12/1953 | McDonald | 8/142 X |
| 2,910,137 | 10/1959 | Victor | 8/142 X |
| 3,089,250 | 5/1963 | Victor | 34/37 |
| 3,095,284 | 6/1963 | Victor | 34/32 |
| 3,134,652 | 5/1964 | D'Angelo et al. | 34/80 X |
| 3,332,854 | 7/1967 | Duckstein | 202/170 |
| 3,362,888 | 1/1968 | Ricigliano | 202/190 |
| 3,395,086 | 7/1968 | Victor | 8/142 X |
| 3,728,074 | 4/1973 | Victor | 8/142 |
| 3,772,854 | 11/1973 | Tamura et al. | 55/74 X |
| 4,045,174 | 8/1977 | Fuhring et al. | 8/142 |

FOREIGN PATENT DOCUMENTS

| 121736 | 10/1930 | Austria | 55/243 |
|---|---|---|---|
| 3275 | 6/1862 | United Kingdom | 252/420 |

OTHER PUBLICATIONS

Rose et al., *Distillation*, Technique of Organic Chemistry, vol. IV, 1951, pp. 374–378, Interscience Pub., Inc.

*Primary Examiner*—Robert H. Spitzer
*Attorney, Agent, or Firm*—Woodard, Weikart, Emhardt & Naughton

[57] ABSTRACT

A method is disclosed herein for recovering a vaporous material from a continuous gas stream. Two charcoal filter assemblies are mounted for raising into a passageway defined by a chamber. The charcoal filters may alternately be lowered from the passageway and into a container for regeneration. The container is filled with water which is then heated to vaporize an azeotrope of the water and the material adsorbed by the charcoal. The water is then drained from the container, and the filter is returned to its position within the passageway.

12 Claims, 6 Drawing Figures

4,175,932

METHOD FOR CONTINUOUS VAPOR RECOVERY

CROSS-REFERENCE TO RELATED APPLICATIONS

This is a continuation-in-part application of our co-pending application, Ser. No. 779,471, filed on Mar. 21, 1977 and now abandoned, the latter application being a continuation of our application, Ser. No. 673,931, filed Apr. 5, 1976 and now abandoned.

BACKGROUND OF THE INVENTION

1. Field of the Invention

This invention relates to adsorption filter units and associated processes for continuously removing a vaporous material from a gas.

2. Description of the Prior Art

There are many commercial processes in which organic solvents and the like are used in the processing or treating of materials. Typically, the cost of the solvent and other factors make it desirable to recover the solvent for repeated use. Moreover, ecological concerns make it desirable to prevent these solvents from being exhausted into the air. Much of the solvent may become vaporized during use, and recovery methods therefore must include means for recovering this vaporized solvent.

Recovery of the volatized organic solvent or the like is generally accomplished by passing the gas, typically air, in which the solvent is supported through an adsorption filter. The filter contains a solid adsorbent, such as activated carbon or charcoal, which adsorbs the vaporous solvent from the supportive gas. The solvent is then removed from the charcoal and collected, with the filter also being regenerated by this procedure for further use.

Various methods and devices have been utilized for solvent recovery by adsorption. In U.S. Pat. No. 3,772,854, issued to Tamura et al. on Nov. 20, 1973, there is disclosed a process for removing sulfur oxides from exhaust gases. The sulfur oxides are adsorbed by charcoal filters and are then removed therefrom by immersing the filters in water to cause formation of sulfuric acid which is retained in the water. The dilute sulfuric acid thereby obtained is collected and concentrated by continuous vaporization of the water present therein. Unlike the present invention, the Tamura et al. procedure removes the adsorbed material from the carbon filters by dissolving the adsorbed sulfur oxides in water. There is no suggestion that the water be heated to vaporize the sulfur oxides from the filter, and indeed this in itself would only result in an exhaust gas containing sulfur oxides, much like the original feed to the adsorption unit. Necessarily, immersion of the carbon filter of Tamura et al. in water causes dissolution of the sulfur oxides in the form of sulfuric acid, but the acid solution is collected in the liquid state and no suggestion of methods or advantages in vaporizing the acid solution is provided. Moreover, it would be the normal expectation that vaporization would be undesirable since this would increase energy requirements, handling and processing equipment needs, and safety precautions.

A method for collecting ammoniacal gases and revivifying animal black filters is disclosed in British Pat. No. 3275, issued to Brooman on Dec. 31, 1861. In accordance with the Brooman procedure, the animal black is restored in its capacity to absorb lime by pouring a boiling solution of carbonate of soda, or caustic soda, onto the animal black in the filter. The solution remains in contact with the animal black for about one hour, with the energy being increased by the injection of steam if needed. The solution is then drained and steam is injected to remove all traces of ammoniacal matters, which have been formed by the action of the carbonate of soda or caustic soda upon the saccharine liquors previously absorbed by the animal black.

In contrast to the present invention, Brooman does not suggest that the soda solution be raised to and maintained at its boiling point, or more precisely at the vaporization temperature of an azeotrope of the solution and the material to be removed from the filter material. Instead, the soda solution is utilized to react with the saccharine liquors to form ammoniacal matters which are driven off by the injection of steam after the soda solution has been removed. In the Austrian Pat. No. 121,736, an apparatus and method are disclosed which relate to a technique for cleaning dust filters. In this type of application, immersion of the filter in a liquid bath is employed to physically disrupt the filtered material. Similarly, in the process of the Brooman patent, the filter is immersed in a liquid bath in order to physically remove the adsorbed materials by chemical reaction and dissolution.

In U.S. Pat. No. 3,089,250, issued to Victor on May 14, 1963, there is disclosed a method for recovering an adsorbed solvent from a charcoal filter. In the Victor method, the adsorbent charcoal is supported upon a perforate surface within a container. Steam is then admitted into the container and contacts the adsorbent to strip the solvent therefrom. A surface located within the container and below the perforate surface is also heated to a temperature above the boiling point of water, and acts to revolatize any condensate which is formed by the steaming operation.

A similar solvent recovery method is disclosed in U.S. Pat. No. 3,332,854, issued to Duckstein on July 25, 1967. The Duckstein patent discloses the use of activated charcoal filters, either singly or alternately, for the recovery of a solvent from a gas stream. When used alternately, the vaporous solvent is adsorbed by one or more filters, while the remaining filters are subjected to a steam desorption process. The Duckstein apparatus passes the solvent laden air vertically through a charcoal bed supported on a sieve. Regeneration and recovery is accomplished by passing superheated steam up through the sieve and into a condensor and separator.

A somewhat different function is performed by the regeneration system disclosed in U.S. Pat. No. 3,362,888 issued to Ricigliano on Jan. 9, 1968. The solvent is adsorbed by a filter in the usual way. An amount of the pure solvent is then vaporized and is passed through the spent filters. As the vaporized solvent passes upwardly through the filters, dirt and sludge is forced off of the filters. Removal of the sludge revivifies the filters, and also permits recovery of the solvent contained within the filters.

Various apparatus for use in filter restoration are also known in the art. U.S. Pat. No. 239,962, issued to Jennings on Apr. 12, 1881, discloses a procedure for regenerating filters by forcing superheated steam through the charcoal in the filter. A pair of filters are employed to enable use of one while the other is being regenerated. In U.S. Pat. Nos. 1,842,316, issued to Coulter on Jan. 19, 1932; 1,868,581, issued to Miller on July 26, 1932; and 2,087,157, issued to Lind on July 13, 1937 are disclosed less related regeneration systems.

In general, the prior art methods utilize either a steam or vapor stripping process in which intimate contact between the adsorbed material and the desorbing steam or vapor is not available, or immersion of the filter in a liquid with the solvent being removed from the filter by entering into solution or reacting with the liquid. In order to obtain efficient operation of these processes either complex and expensive structures or the use of superheated steam is required. It would therefore constitute a significant improvement over the prior art techniques if the adsorbed solvent could be recovered and the filters regenerated in a simpler and less expensive manner. It is also desirable that the regeneration of the filters be accomplished in a short amount of time in order to minimize the period during which a given filter is undergoing desorption and therefore is not in use.

SUMMARY OF THE INVENTION

One aspect of the present invention comprises providing a vapor recovery system including first and second charcoal filters located within a chamber between an inlet and an outlet, means for moving one of the filters from the passageway and surrounding the isolated filter with water, means for causing the water and materials adsorbed by the filter to vaporize, and collection means for recovering the vaporized mixture of the water and materials. A vaporous material is recovered from a gas in another aspect of the invention relating to a method comprising the steps of flowing the gas containing the material through a charcoal filter to adsorb the material, placing the filter in water and heating the water to cause vaporization of the water and adsorbed material, collecting the vaporized mixture of water and material, and separating and collecting the material from the vaporized mixture.

It is an object of the present invention to provide a vapor recovery system which operates continuously.

Another object of the present invention is to provide a vapor recovery system which operates efficiently and with a minimum of attention and maintenance.

A further object of the present invention is to provide a vapor recovery system which has a simple and durable construction, and which is relatively inexpensive to produce and maintain.

It is another object of the present invention to provide an efficient method for recovering a vaporous material from a continuous gas stream.

A still further object of the present invention is to provide a method for quickly and efficiently regenerating a solvent laden adsorption filter.

Further objects and advantages of the present invention will become apparent from the figures and description which follow.

DESCRIPTION OF THE PREFERRED EMBODIMENT

Figure 1:
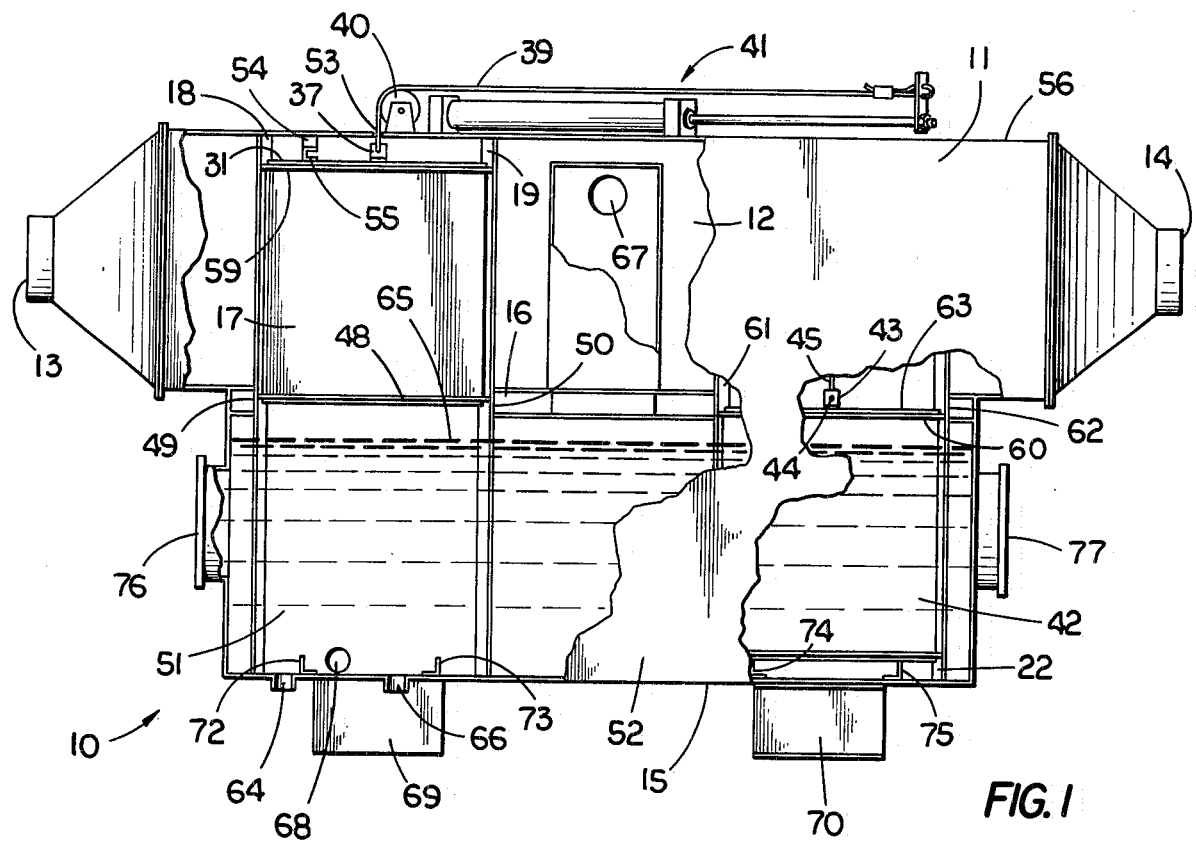
FIG. 1 is a partial, cross-sectional side view of one embodiment of a vapor recovery apparatus constructed in accordance with the present invention.

Referring now to the figures, there is shown a vapor recovery system 10 according to one embodiment of the present invention. System 10 includes a chamber 11 which defines a passageway 12 extending from inlet 13 to outlet 14. The vaporous material is recovered from a gas, typically air, which is fed into chamber inlet 13. The vaporous material is removed from the gas in chamber 11 and the gas passes through chamber outlet 14.

Connected to the bottom of and forming a part of chamber 11 is container 15. Container 15 is open to chamber 11 except in the central part, where wall 16 sealingly separates container 15 from passageway 12. Mounted within chamber 11 are adsorption filters or wafers such as 17. Wafer 17 is mounted within L-shaped wafer guides 18–21, which are attached to and extend continuously along the vertical walls of chamber 11 and container 15. Wafer 42 is similarly mounted within wafer guides such as 22. Wafers 17 and 42 may be slid vertically within the associated wafer guides, and thereby may be positioned within chamber 11 or container 15.

Figure 2:
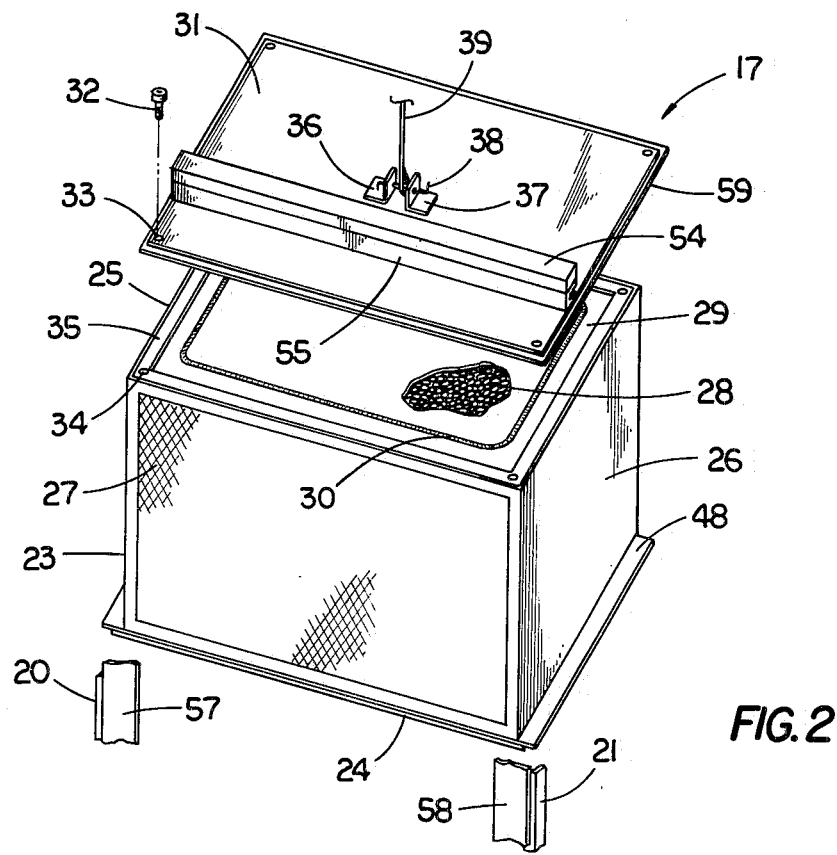
FIG. 2 is a partially-exploded, perspective view of a filter useful in a vapor recovery apparatus of the present invention.

Referring in particular to FIG. 2, there is shown a partially-exploded view of wafer 17. Wafer 42 is identical to wafer 17, which includes a rigid container 23 having gas-impermeable bottom 24 and sides 25 and 26. A coarse screen 27 of stainless steel or another suitable material forms one end of container 23, and an identical screen (not shown) forms the opposite end. Charcoal granules 28 are contained within bag 29 which is located and held within container 23. Bag 29 is provided with a zipper 30 to facilitate addition and removal of the charcoal granules 28 thereto. A gas-impermeable plate 31 is fastened to and forms the top of container 23. Bolts, such as 32, are inserted through apertures, such as 33, and are threadedly received within apertures such as 34 along the perimeter 35 of container 23.

Figure 3:
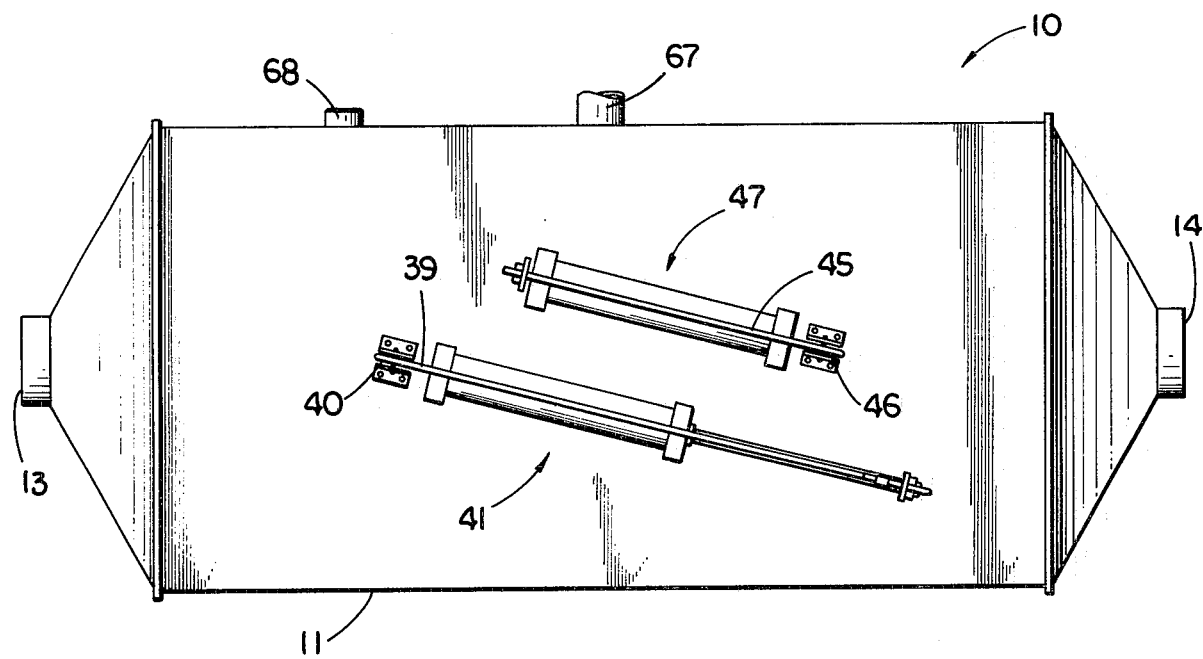
FIG. 3 is a top view of the apparatus of FIG. 1.
Figure 4:
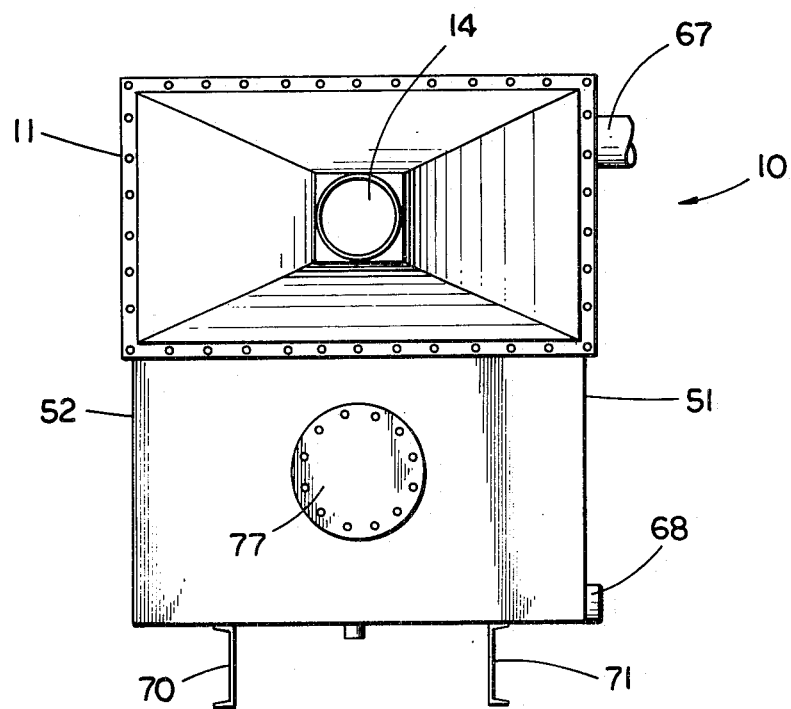
FIG. 4 is an end view of the apparatus of FIG. 1.

Attached to the top 31 of wafer 17 are two angle irons 36 and 37. Pin 38 is received within apertures in angle irons 36 and 37, and cable 39 is attached thereto. Cable 39 is connected through pulley 40 to plunger assembly 41 (FIG. 1) of a known construction and operation. In a similar fashion, wafer 42 includes angle irons such as 43 and pin 44. Cable 45 extends over pulley 46 and is connected to a second plunger assembly 47 (FIG. 3).

Each wafer is positioned vertically along the associated wafer guides in accordance with the action of the related plunger assemblies. When plunger assembly 41, for example, is in the extended position (FIG. 1), cable 39 extends only a short distance into container 10. Wafer 17 is thereby held in the adsorption position within passageway 12. A filter in the adsorption position is fully sealed to ensure that gas entering inlet 13 will not be permitted to pass into container 15 or out the aperture in the top of chamber 11 through which the supporting cable, such as 39, extends. Wafer 17 therefore includes a bottom wafer seal 48 (FIG. 2) which extends around the perimeter of bottom 24. When wafer 17 is in the adsorption position (FIG. 1), bottom wafer seal 48 engages walls 49 and 50 which extend adjacent the ends of wafer container 23 to both sides of container 15. Bottom wafer seal 48 further engages side walls 51 and 52 of container 15, and the gas entering passageway 11 is thereby prevented from passing underneath wafer 17 into container 15. A cable seal 53 is provided at the aperture through which cable 39 extends to prevent the gas from escaping at that location. In addition, seal 54 is connected to angle iron 55 and provides an additional barrier to the gas. Seal 54 also operates to locate the wafer 17 properly within passageway 12 by engaging top wall 56 of chamber 11. Seal 54 is somewhat compressible to compensate for variations in the extension of plunger assembly 41.

The described seals therefore prevent the gas from passing into container 15 and from escaping through the aperture in which cable 39 is received. Side seals 57 and 58 are connected to front wafer guides 20 and 21 to prevent the gas from passing around, rather than through, wafer 17. Seals 57 and 58 are flexed inwardly toward the wafer 17 to seal along the edges of sides 25 and 26 of container 23. Seals 57 and 58 comprise any suitable material, and preferably are formed from Teflon to have a long life. Modifications in the construction and placement of the various seals as herein described may be made as desired, and fall within the general purvue of the present invention.

Wafers 17 and 42 are also provided with top wafer seals 59 and 60, respectively. The top wafer seals, such as 59 (FIG. 2), are attached to and extend perimetrically about the top, such as 31, of the wafer. The primary function of the top wafer seal is to seal off the wafer and container 15 when the wafer is in the down or desorption position. Wafer 42, for example, is positioned in the desorption position (FIG. 1), and top wafer seal 60 engages walls 61 and 62 and wide walls 51 and 52 of container 15. In this manner, top wafer seal 60 prevents a gas from entering into or escaping from container 15 at any location around the perimeter of top 63 of wafer 42. Again, many variations of this preferred construction and location for the top wafer seal will be obvious to persons of ordinary skill in the art, and fall within the purview of the present invention.

By the structure disclosed herein, gas entering inlet 13 will pass exclusively through passageway 12 to outlet 14. Wafers 17 and 42 may be alternately or simultaneously positioned within passageway 12 to effect adsorption of a vaporous material, such as an organic solvent, which is carried by the gas directed through passageway 12.

Regeneration or desorption of a wafer is accomplished within container 15. With wafer 42 in the desorption position (FIG. 1), water from a holding tank (not shown) is admitted into container 15 through water inlet 64. This water is admitted to achieve a level 65 which is above the level of the charcoal granules within the desorbing wafer. Steam is then admitted into container 15 through steam inlet 66, bringing the temperature of the water to its boiling point. Container 15 includes a vent 67 which is sealed off from but extends along the side of chamber 11. The steam and other vaporized materials pass through vent 67 to a condensor and separator (not shown).

When the water within container 15 achieves its boiling point, steam will form which will pass through vent 67. In addition, the solvent adsorbed by the granular charcoal will have a boiling point less than that of water, and the solvent will therefore revaporize. The vaporous solvent will similarly pass through vent 67 to the condensor and separator. In this manner, the desorption and regeneration of wafer 42 is accomplished.

It has been found that the vaporization of the solvent adsorbed by the charcoal will cause a substantial amount of movement of the charcoal granules in the wafer. This movement is desirable in that it increases the efficiency of the desorption process, and also releases some of the fine charcoal and dirt particles contained in the wafer. Removal of these particles from the wafer provides a more efficient adsorption filter. Further, the water containing the charcoal and dirt particles may be filtered between uses to remove these particles.

The desorption and regeneration of wafer 17 is accomplished in an identical manner. When sufficient desorption of wafer 42 is completed, the steam being admitted through steam inlet 66 is shut off. The water and suspended dirt and charcoal particles are then removed through drain 68 either to a filter assembly (not shown) or directly to a holding tank. Wafer 42 is then raised along wafer guides, such as 22, to the adsorption position within passageway 12. This is accomplished by the activation of plunger assembly 47 to cause it to assume an extended position. Wafer 17 may then lowered, by appropriate activation of plunger assembly 41, along wafer guides 18–21 into container 15. Water and steam are then successively admitted into container 15 as before, and the regeneration of wafer 17 is performed as previously described with respect to wafer 42.

All of the operations of the continuous vapor recovery system 10 may be performed automatically with appropriate controls presently known. The system is then more easily operated and requires a minimum of supervision.

A number of additional elements may be included in the vapor recovery system 10 as required by the particular application. Legs 69–71, for example, are shown connected to the bottom wall of container 15 to support the system in use. In addition, angle irons 72–75 are provided along the interior of the bottom wall of container 15 as structural support for legs such as 69–71. Angle irons 72–75 also provide a support for the bottom of the wafers, such as 42 (FIG. 1), and thereby ensure proper positioning of the wafers in the desorption position. Angle irons 72 and 73 further support wafer 17 above the bottom wall of container 15 to permit the proper functioning of water inlet 64, steam inlet 66 and drain 68. Another example of additional elements which may be desired for the operation of this system are access ports 76 and 77 which are located at the ends of container 15.

This invention is equally applicable to recovery of vapors of perchlorethylene, 1, 1, 1-trichlorethane, petroleum distillates, Freon 113, or other organic solvents. Conventional gravity water separation techniques using a coalescer are appropriate with water immiscible solvents. The water used may be recycled to minimize solvent and energy loss.

If desired, a consumable electrode may be used to minimize the action of the solvents and their hydrolysis products as well as to minimize the electrolytic action of the carbon with respect to the metal components. A zinc electrode could be used for this purpose.

Figure 5:
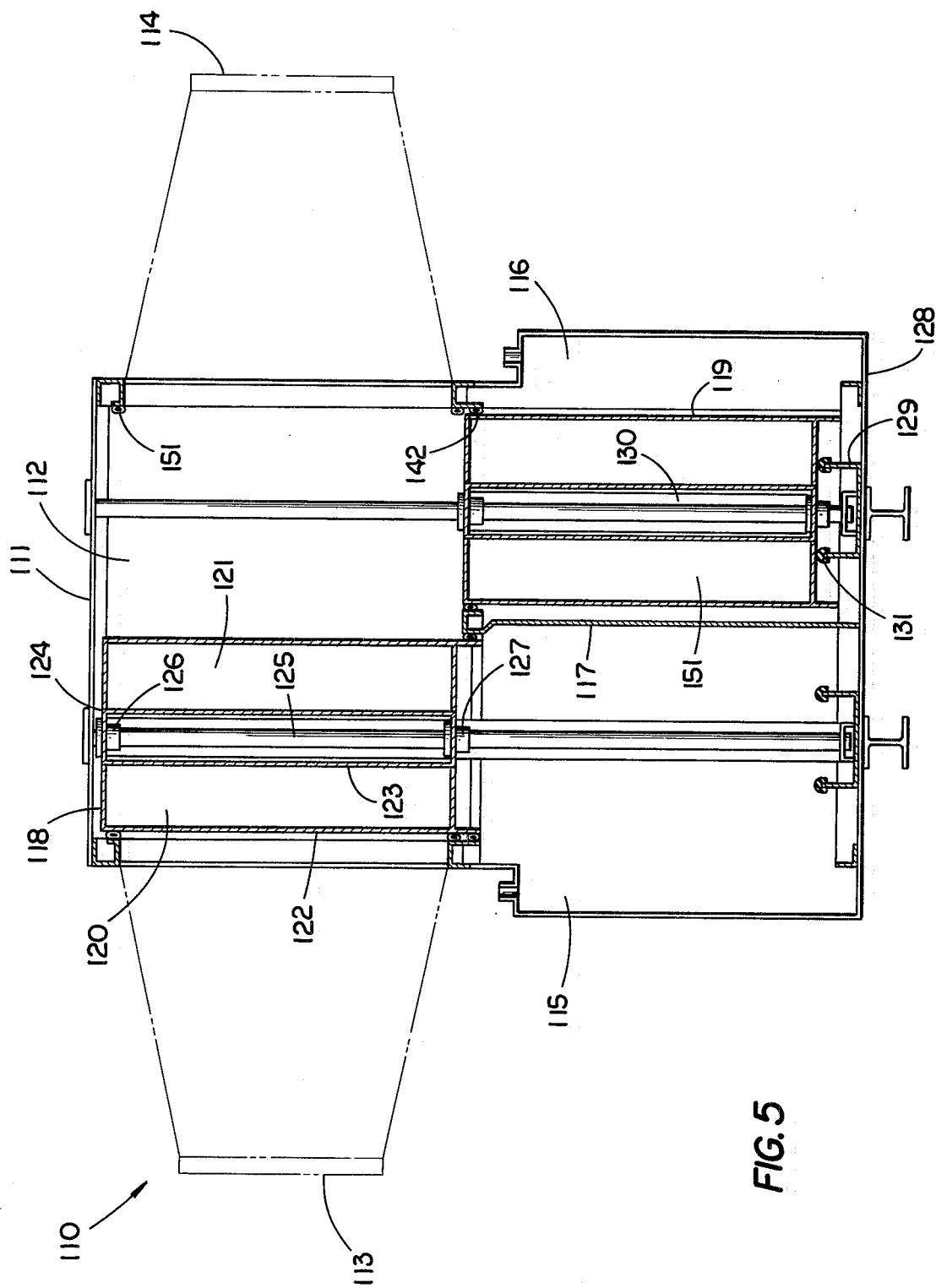
FIG. 5 is a side, cross-sectional view of an alternate embodiment of a vapor recovery apparatus constructed in accordance with the present invention.
Figure 6:
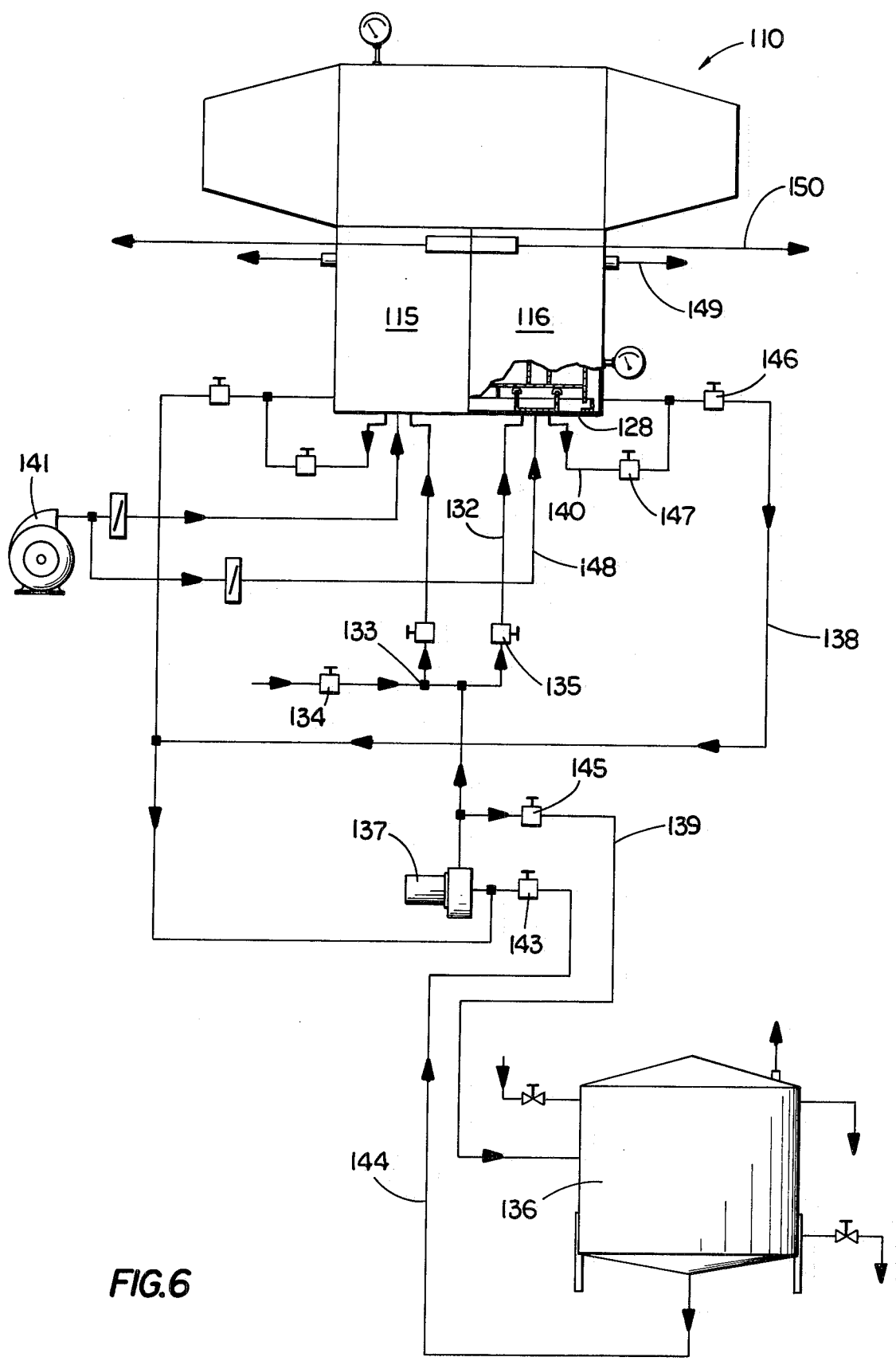
FIG. 6 is a diagrammatical view of the apparatus of FIG. 5 shown with the associated equipment used in operation of the unit.

Referring now to FIGS. 5 and 6, there is shown an alternate embodiment of a vapor recovery system 110 constructed in accordance with the present invention. System 110 includes a chamber 111 defining a passageway 112 extending from inlet 113 to outlet 114. As previously described, the vaporous material is recovered from air or another gas which is fed into the chamber inlet 113, the vaporous material being removed from the gas in chamber 111 and the gas passing through chamber outlet 114.

Connected to the bottom of and forming a part of chamber 111 are containers 115 and 116, separated by a dividing wall 117. Mounted within chamber 111 are bifurcated adsorption filters or wafers 118 and 119. The wafers 118 and 119, and the associated structures, are essentially mirror images of one another, and therefore the description of these items will to the extent possible be limited to a description of only one of the two corresponding items.

Each of the wafers is mounted within system 110 to be movable from a first, adsorption position, such as that shown for wafer 118, and a second, desorption or regeneration position, such as that shown for wafer 119. Each of the wafers comprises a pair of spaced apart wafer units, such as 120 and 121 which form parts of wafer 118. The wafer units are similar in construction to the wafer 17 depicted in FIG. 2, with the sides, bottom and top forming a perimetric seal about the front and rear, screened faces, 122 and 123 respectively. The pair of wafer units are secured together by a supporting framework 124 which forms a seal about the two sides and top of the space between the wafer units. The bottom of the space between the wafer units is substantially open, as will be more fully described below.

Wafer 118 is maintained in position within the chamber 111 and respective container 115 by a pair of alignment rods, such as 125. The alignment rods, such as 125, extend from the top of chamber 111 to the bottom of the associated container, and are secured at their ends respectively thereto. The positioning of the alignment rods corresponds to the space between the wafer units, with the alignment rods thereby being received between the wafer units. Framework 124 includes a first sleeve, such as 126, and a second sleeve, such as 127, for reception therein of a corresponding alignment rod. Thus, each of the alignment rods, such as 125, extends through the space between corresponding wafer units, and is received at the top and bottom of this space by sleeves which are mounted to the framework of the wafer. With use of at least a pair of alignment rods for each wafer, and a pair of sleeves for reception of each of the alignment rods, the positioning of wafer 118 with respect to chamber 111 and container 115 may be precisely controlled. As will be further detailed, the sleeves are constructed to permit movement of the wafers relative to the associated alignment rods to move the wafers from the first, adsorption position to the second, regeneration position.

The wafers are moved to and retained in the first, adsorption position by the operation of pneumatic cylinders associated with the respective wafers. Preferably, a pneumatic cylinder is secured to the container bottom in proximity to each of the alignment rods provided for the particular wafer. The cylinders (not shown) extend upwardly to be received within the space between the corresponding wafer units for the particular wafer and include a piston rod which extends upwardly to and is secured to the framework, such as 124, at the top of the associated wafer. As would be obvious to one skilled in the art, the pneumatic cylinders may be operated by causing extension of the piston rod from the cylinder, thus moving the piston rod upwardly into chamber 111.

The upward extent of movement of the wafers is readily controlled by control of the extension of the associated piston rods from their respective cylinders. This is typically accomplished by providing for upward movement of the wafer until it abuts the top of chamber 111 or another member secured to the chamber for this purpose.

Each of the wafers has a second, regeneration position, such as that shown for wafer 119. As will be appreciated, the wafers are moved from their first, adsorption position to their second, regeneration position by retraction of the piston rods into the associated pneumatic cylinders, and by the sliding of the sleeves along respective alignment rods. In the regeneration position, the wafers rest upon a channel, such as 128, which extends for the full width of container 115. channel 128 includes upright portions such as 129 contacting the bottom of wafer 119 in the regeneration position. The upright portions, such as 129, provide for communication between the interior of channel 128 and the space 130 between the wafer units of wafer 119. Sealing gaskets, such as 131, are provided upright portions 129 to provide a seal between the bottom of the wafer and the channel. The channel, and the seal therewith, fully surround the open portion of the bottom of the wafer which corresponds to the space between the wafer units.

Referring now in particular to FIG. 6, there is shown a typical installation utilizing the continuous vapor recovery apparatus and method of the present invention, together with the associated equipment. Again, since the associated apparatus for one wafer and container is essentially duplicated for the other wafer and container, only one set of the apparatus will be described when possible, it being understood that a similar description of the other, corresponding apparatus would apply.

In similarity to the previous embodiment described with respect to FIGS. 1-4, the system 110 provides for the positioning of one or the other wafers in the respective container for regeneration. The regeneration is accomplished by providing for the immersion of the wafer in water heated sufficiently to vaporize a solvent-/water azeotrope which is subsequently processed for separation out of the solvent. For this reason, each of the containers, which are entirely separate as previously described, is provided with a water inlet such as 132 communicating with the interior of container 116. Water inlet 132 communicates with the interior of channel 128. As previously described, the bottom of each wafer in the central portion (corresponding to the space between the wafer units) is substantially open. Gasket 131 on the upright portions of channel 128 provides a full seal surrounding this open portion of the bottom of the wafer. In accordance with this construction, the water entering into channel 128 is forced through this bottom opening and into the space between the wafer units, from which it subsequently passes through the wafer units into the remaining portion of container 116. Preferably the water is introduced through perforate headers (not shown) which extend upwardly within the space between the wafer units, which as will later become apparent will enhance the efficiency of the regeneration due to a better distribution of the water influx through the wafer units as the water is recirculated during regeneration. As described for the previous embodiment, steam is also injected into the water to elevate the water temperature to vaporize the solvent/water azeotrope. Other heating methods could be equally employed, with the steam being preferred since it is generally less expensive and readily available. The steam injection is typically achieved by injecting low pressure steam into the water before passing the water into the container, as shown diagramatically at location 133. Valves, such as 134 and 135 are employed to regulate the steam injection and water flow, respectively.

An amount of water is introduced into the regenerating container 116 sufficient to fully immerse the adsorbing charcoal contained within the wafer units. This level is below the level of the outlets 150 and 149 provided for removal of the solvent/water azeotrope and for exhausting of drier air, respectively, as will be further described below. During the regeneration procedure, water is continuously cycled through the regenerating container while maintaining the water level therein. Because the steam injection is employed for heating the water, an increase in the water level will generally occur due to condensation of the steam upon injection. Means are therefore provided for regulating the water level in the container during regeneration, to prevent the water level from rising to the level of the solvent and air outlets.

The water is initially obtained for filling the container from a water holding tank 136 and is moved therefrom into the container by a water pump 137. Recirculation of the water is achieved by introducing the water through inlet 132, allowing the water to pass through the respective wafer units to the surrounding container, permitting the water to exit through recirculation line 138, and finally driving the water back into the container by means of pump 137. During regeneration, drier air outlet 149 is closed and the solvent/water azeotrope outlet 150 is open to provide for passage of the azeotrope vapor to pass to a recovery system. The recirculation of the water is continued, with steam being injected as previously described, for a length of time sufficient to cause desired vaporization of the solvent/water azeotrope to remove the solvent from the adsorption wafer.

Upon completion of the regeneration of the wafer, the water is removed from the container by pump 137, which moves the water through line 139 and back into the water holding tank 136. The water is removed both through recirculation line 138, and also through channel drain line 140 which will primarily receive the water within the sealed channel 128. With the water having been removed, the solvent/water azeotrope outlet 150 is closed and drier air outlet 149 is opened. Air is moved by blower 141 through line 148 into channel 128. Again due to the seal provided between channel 128 and the bottom of the associated wafer 119, the air is caused to move into the space between the wafer units and through the units into the surrounding portion of the container. The air is exhaust from the container through outlet 149. Introduction of the drying air is continued for a predetermined period of time as desired to provide drying of the wafer units. The regeneration has thereby been completed and the wafer is ready for return to the chamber 111 to adsorb additional solvent.

An inflatable seal 142 is provided around the entire perimeter of the top of container 116. This seal 142 is inflated when the wafer is in the regeneration position to provide a seal against the otherwise solid top of the wafer, thereby completely sealing the container 119 from the chamber 111. In this manner the solvent laden gas in passageway 112 is prevented from passing into the container and similarly the solvent/water azeotrope and the drying air are blocked from moving into the passageway 112.

To provide a fuller understanding of the operation of the apparatus depicted in FIG. 6, a brief description of the conditions of the associated apparatus during the regeneration procedure will now be provided. Initially, wafer 119 is lowered by the associated pneumatic cylinders into container 116 until the wafer rests upon the gasket 131 on channel 128. The inflatable seal 142 is then inflated to provide a complete sealing off of container 116 from chamber 111, and more particularly from passageway 112. At this time the valve 143 on water line 144 leading from the holding tank 136 to pump 137 is opened, as is the valve 135 on the line leading from the pump to container 116. Valve 145 on the line 139 leading from pump 137 to holding tank 136 is closed during this time. Valve 146 on recirculation line 138 and valve 147 on channel drain line 140 are also both closed, and the water is thereby introduced into container 116 until it is filled to the appropriate level. During the filling process the steam valve 134 is open and steam is injected into the water to elevate the water temperature. Also during the filling process, the drier air line 148 and outlet 149 are closed by the operation of efficient dampers (not shown).

With the water having achieved the desired level, valve 143 is closed and valve 146 is opened to provide for recirculation of the water through pump 137 and into container 116. During this time the water temperature is elevated to and maintained at a temperature sufficient to cause vaporization of a solvent/water azeotrope which is recovered through the azeotrope outlet 150 which conducts the azeotrope to a solvent recovery system. When this procedure has proceeded for a sufficient length of time, valve 147 on channel drain 140 and valve 145 on the water line 139 leading to the water holding tank are opened, and the steam valve 134 and water inlet valve 135 are closed. In this manner, the water is removed from container 116 and returned to the holding tank. At this time, the azeotrope vent 150 is closed and the drier air inlet line 148 and exhaust 149 are opened and air is moved by blower 141 into container 116 and through the wafer units as previously described. Upon completion of this step, the drier inlet and outlet are closed and the wafer is ready for return to the chamber 111 for further solvent adsorption.

To move the wafer back into position within the chamber 111, the inflated seal 141 is deflated and the pneumatic cylinders are employed to move the wafer along the associated alignment rods and into position within the passageway 112. Once the wafer is in the fully elevated position, the seal 141 is again inflated, this time to provide a perimetric seal about the bottom of the wafer. Similarly, an inflatable seal 151 (FIG. 5) is located about the perimeter of the chamber 111 and is inflated against the perimeter of the rear face of wafer 119 to provide a seal thereagainst. A similar seal is provided for inflation against the front face of wafer 118. The seals are provided to insure that the solvent laden gas moving through the system will pass through the wafer units, and not around them.

As previously described, the only open portions of the wafers are the faces of the wafer units and the central portion of the bottom of the wafer. The indicated seals therefore require that air passing through the passageway 112 move through the wafer units. The seal 151 together with the solid sides and top of the wafer 119, and together with the seal 141 with respect to the bottom of the wafer require that the gas move into and through the first wafer unit 151. Once the gas has moved through the wafer unit 151, it is possible for the gas to move down through the central, open portion of the bottom of the wafer. However, since the drier inlet and outlet, the water connections and the azeotrope outlet are all closed, there is nowwhere for the gas to move. The seal 141 prevents the gas from moving down through this central opening and then around the bottom of the wafer to the chamber outlet 114. Thus, the gas will necessarily continue through the second wafer unit in order to reach the only available outlet, which is the chamber outlet 114.

The embodiment of FIGS. 5 and 6 differs from the previous embodiment primarily in the use of the bifurcated wafers, the method for raising and lowering the wafers, and the means provided for introducing the water and the drier air between the wafer units. It is believed that the latter embodiment is preferable due to the advantages obtained from these differences, primarily the ability to more efficiently regenerate the wafer units by passing the recirculating water and the drying air into the center of the wafers and outwardly through the two wafer units. However, it is believed that the primary advantage for each of the described systems is the employment of the water immersion together with the vaporization of a solvent/water azeotrope as a means for regenerating the charcoal.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for removing material in vapor form from a gas comprising the following steps:
    a. flowing the gas containing said material through a charcoal filter, said filter absorbing said material;
    b. placing said filter in water to submerge the charcoal in the water;
    c. heating said water to vaporize a mixture of said water and said material, whereby substantial movement of the charcoal is produced resulting in an efficient desorption process and the release of fine particles in the filter;
    d. collecting the vaporized mixture of said water and said material; and
    e. separating and collecting said material from said vaporized mixture.

2. The method of claim 1 in which step a. comprises flowing the gas through a charcoal filter having spaced-apart filter units each containing charcoal, the method further including circulating the water through the charcoal filter by moving the water into the space between the filter units and thereafter through the filter units.

3. The method of claim 1 in which the material is an organic solvent.

4. The method of claim 3 in which the material is immiscible with water.

5. A method for removing material in vapor form from a continuous gas stream comprising the following steps:
    a. flowing the gas stream containing said material through first and second charcoal filters, said first and second filters absorbing said material;
    b. isolating said first filter from said continuous gas stream, said gas stream continuing to pass through said second filter;
    c. placing said first filter in water to submerge the charcoal in the water;
    d. heating said water to vaporize a mixture of said water and said material, whereby substantial movement of the charcoal is produced resulting in an efficient desorption process and the release of fine particles in the filter;
    e. collecting the vaporized mixture of said water and said material;
    f. separating and collecting said material from said vaporized mixture;
    g. removing said first filter from said water;
    h. flowing the gas containing said material through said first filter, said first filter absorbing said material;
    i. repeating steps b through h with said second filter.

6. The method of claim 5 in which step a. comprises flowing the gas through a charcoal filter having spaced-apart filter units each containing charcoal, the method further including circulating the water through the charcoal filter by moving the water into the space between the filter units and thereafter through the filter units.

7. The method of claim 5 and which further includes, after step g. and prior to step h., the additional step of passing air through the charcoal filter into the space between the filter units and, thereafter through the filter units to dry the charcoal filter.

8. The method of claim 5 in which said flowing of step a. is accomplished by directing said gas stream into a chamber having an inlet and an outlet, said first and second filters being mounted in series in said chamber between the inlet and the outlet.

9. The method of claim 8 in which said isolating of step b. is performed by removing said first filter from said chamber.

10. The method of claim 9 in which step c. comprises the following substeps:
    placing said first filter in a container; and
    after said placing, filling said container with said water.

11. The method of claim 10 in which step g. comprises the following substeps:
    draining said water from said container; and
    after said draining, removing said first filter from said container.

12. The method of claim 11 in which said isolating of step b. is performed by lowering said first filter from said chamber into said container, said first filter having a top seal which seals said first filter and said container from said chamber when said first filter is lowered into said container.

* * * * *